(12) United States Patent
Fiedler

(10) Patent No.: US 12,381,463 B2
(45) Date of Patent: Aug. 5, 2025

(54) ADJUSTABLE SYSTEM TO MINIMIZE MAGNETIC MOTOR SIDE LOADS

(71) Applicant: Attollo Engineering, LLC, Camarillo, CA (US)

(72) Inventor: Andreas Fiedler, Camarillo, CA (US)

(73) Assignee: Attollo Engineering, LLC, Camarillo, CA (US)

( * ) Notice: Subject to any disclaimer, the term of this patent is extended or adjusted under 35 U.S.C. 154(b) by 146 days.

(21) Appl. No.: 18/105,972

(22) Filed: Feb. 6, 2023

(65) Prior Publication Data

US 2024/0266935 A1 Aug. 8, 2024

(51) Int. Cl.
*H02K 41/03* (2006.01)

(52) U.S. Cl.
CPC ......... *H02K 41/03* (2013.01); *H02K 2213/09* (2013.01)

(58) Field of Classification Search
CPC .......... H02K 7/04; H02K 33/16; H02K 41/00; H02K 41/02; H02K 41/025; H02K 41/03; H02K 41/031; H02K 41/033
See application file for complete search history.

(56) References Cited

U.S. PATENT DOCUMENTS

| | | | |
|---|---|---|---|
| 4,675,563 A | 6/1987 | Goldowsky | |
| 5,525,845 A | 6/1996 | Beale et al. | |
| 6,231,310 B1 | 5/2001 | Tojo et al. | |
| 6,250,895 B1 * | 6/2001 | Kawahara | F04B 35/045 417/363 |
| 8,607,560 B2 | 12/2013 | Fiedler | |
| 2006/0220473 A1 * | 10/2006 | Ueda | H02K 1/18 310/23 |
| 2019/0245425 A1 * | 8/2019 | Kim | H02K 1/17 |
| 2022/0140719 A1 * | 5/2022 | Kim | H02K 16/04 417/415 |

FOREIGN PATENT DOCUMENTS

CN 106704144 A * 5/2017
EP 0098002 A2 1/1984
(Continued)

OTHER PUBLICATIONS

Shimoda, Machine Translation of Claims of JP2003102160, Apr. 2003 (Year: 2003).*

(Continued)

*Primary Examiner* — Eric Johnson
(74) *Attorney, Agent, or Firm* — Billion & armitage

(57) ABSTRACT

A moving magnet motor system including a cylinder having a cylindrical axis and a rider disposed within the cylinder, wherein the rider moves longitudinally along the cylindrical axis within the cylinder. The moving magnet motor system further including a coil configured to generate an electromagnetic field, a magnet ring support structure affixed to the rider and a magnetic ring affixed to the magnet ring support structure and comprising a plurality of magnets configured to interact with the magnetic field generated by the coil to impart linear force to the rider. The moving magnet motor system further includes one or more ferromagnetic rods extending parallel to the cylindrical axis wherein the ferromagnetic rod(s) are configured to minimize or offset a bearing side load.

20 Claims, 14 Drawing Sheets

(56) References Cited

FOREIGN PATENT DOCUMENTS

JP           2003102160 A   *   4/2003
JP           2010041761 A   *   2/2010

OTHER PUBLICATIONS

Shimoda, Machine Translation of JP2003102160, Apr. 2003 (Year: 2003).*
Li, Machine Translation of CN106704144, May 2017 (Year: 2014).*
Asao, Machine Translation of JP2010041761, Feb. 2010 (Year: 2010).*
"Extended European Search Report Received for Application No. 24155506.9 mailed on Jul. 12, 2024", 6 Pages.
Wilson, Kyle B., "High Efficiency Pressure Oscillator for Low-Temperature Pulse Tube Cryocooler", Purdue University Purdue e-Pubs; 2004; 8 pages.
"Extended European Search Report Mailed on Apr. 22, 2025", 10 Pages.

* cited by examiner

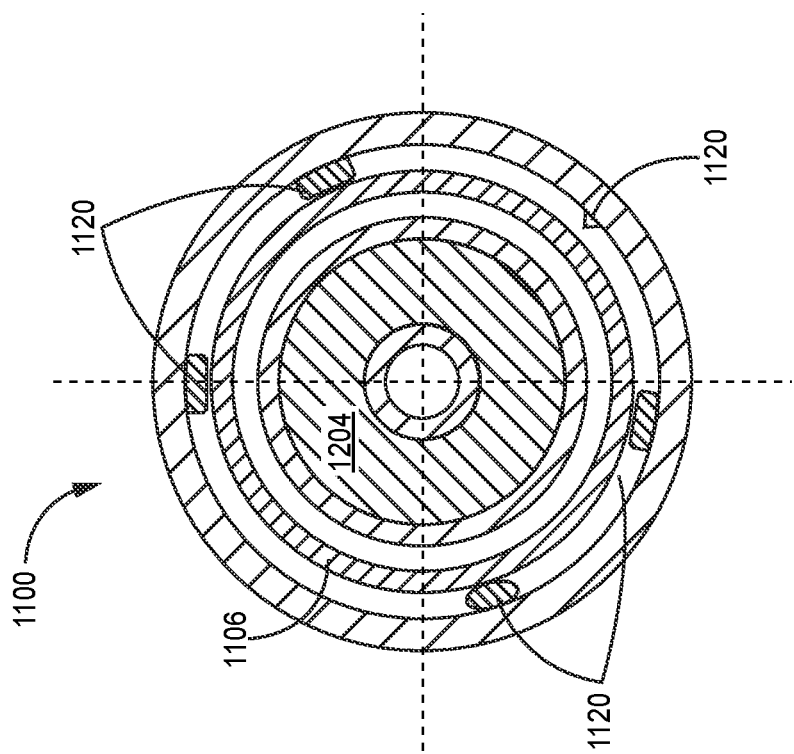
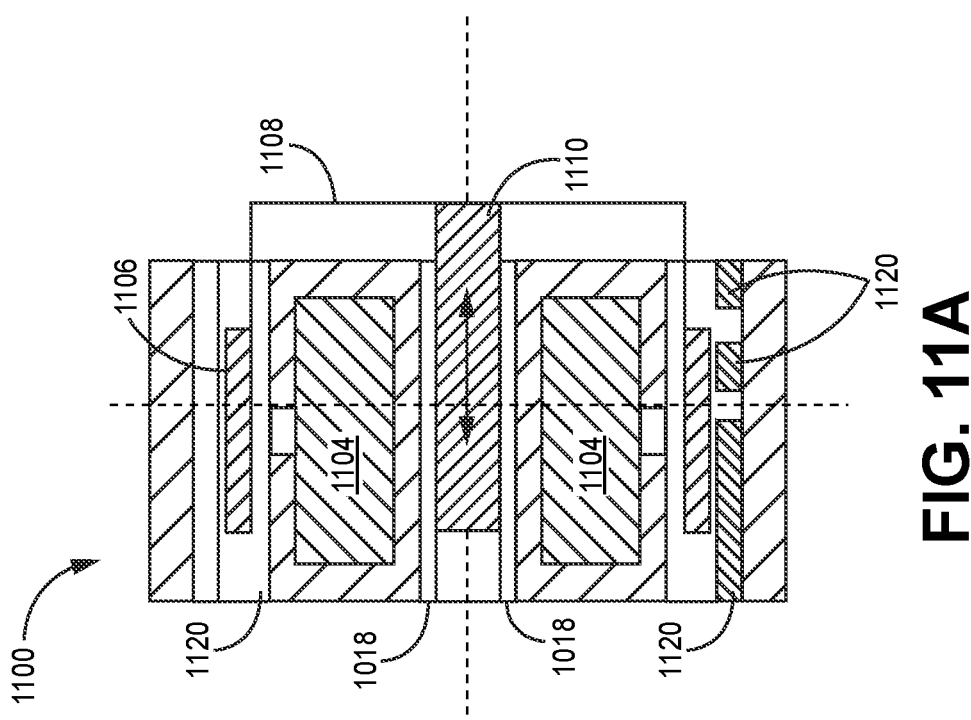
FIG. 11B
FIG. 11A

ADJUSTABLE SYSTEM TO MINIMIZE MAGNETIC MOTOR SIDE LOADS

STATEMENT OF GOVERNMENT RIGHTS

This invention was made with government support under Contract No. [HQ0860-22-C-7128], awarded by the Missile Defense Agency. The government has certain rights in the invention.

BACKGROUND

Various applications (e.g., semiconductors, superconductors, optic systems, etc.) require efficient, low power cooling. Moving magnet and linear reluctance motors are often utilized for low-power cooling due to their high motor efficiency and compact design. In general, a moving magnet motor comprises a moving magnet ring, a rider (i.e., a bearing or piston) limited to two degrees of freedom, and a cylinder.

One of the main limitations of a linear moving magnet or reluctance motor are motor side loads, i.e., (pressure loading) force between the rider and cylinder wall (or bearing sleeve) caused by mis-alignment of the moving magnet ring from the longitudinal axis, mis-alignment of other motor components (e.g., the inner yoke, outer yoke, etc.), or non-uniform magnetization. Such motor side loads may cause wear and rapid deterioration of the cylinder wall and the rider. Misaligned motor components or nonuniform magnet rings may generate side loads. Tight dimensional tolerances of motor parts and alignment of motor components are often required to magnetically center the magnet ring. However, such methods and components are expensive, time consuming, and unreliable

SUMMARY

According to one or more embodiments of the present disclosure, a moving magnet motor system, comprising a cylinder having a cylindrical axis, a rider disposed within the cylinder, wherein the rider moves longitudinally along the cylindrical axis within the cylinder. The moving magnet motor system further comprising a coil configured to generate a magnetic field, a magnetic ring support affixed to the rider, a magnetic ring affixed to the magnetic ring support and comprising a plurality of magnets configured to interact with the magnetic field generated by the coil to impart linear force to the rider, and one or more ferromagnetic rods extending parallel to the cylindrical axis.

According to one or more embodiments, a moving magnet motor, comprising a cylinder having a cylindrical axis, a rider disposed within the cylinder, wherein the rider is configured to move longitudinally along the cylindrical axis, a coil configured to generate a magnetic field, a magnetic ring support affixed to the rider, and a magnetic ring affixed to the magnetic ring support. The linear motor further comprises an alignment assembly including one or more ferromagnetic rods in magnetic communication with the magnetic ring, and one or more rings coupled to each of the one or more ferromagnetic rods, wherein each of the one or more ferromagnetic rods are positionally adjustable.

According to some embodiments, a Stirling cooler comprising a moving magnet motor system and a cooling system. The moving magnet motor system includes a cylinder having a cylindrical axis, a rider disposed within the cylinder, wherein the rider moves longitudinally along the cylindrical axis within the cylinder, a coil configured to generate a magnetic field, a magnetic ring configured to interact with the magnetic field generated by the coil to impart linear force to the rider, and one or more ferromagnetic rods extending parallel to the cylindrical axis. The cooling system includes a displacer, a compression chamber disposed between the displacer and the rider, and an expansion chamber.

BRIEF DESCRIPTION OF DRAWINGS

This written disclosure describes illustrative embodiments that are non-limiting and non-exhaustive. Reference is made to illustrative embodiments that are depicted in the figures, in which:

FIG. 11A illustrates a diagrammatic side view of a moving magnet motor system having one or more ferromagnetic rods disposed on an outer yoke wherein a motor coil is disposed radially inward of a magnetic ring, according to some embodiments.

FIG. 11B illustrates a diagrammatic front view of a moving magnet motor system having one or more ferromagnetic rods disposed on an outer yoke wherein a motor coil is disposed radially inward of a magnetic ring, according to some embodiments.

DETAILED DESCRIPTION

Figure 1:
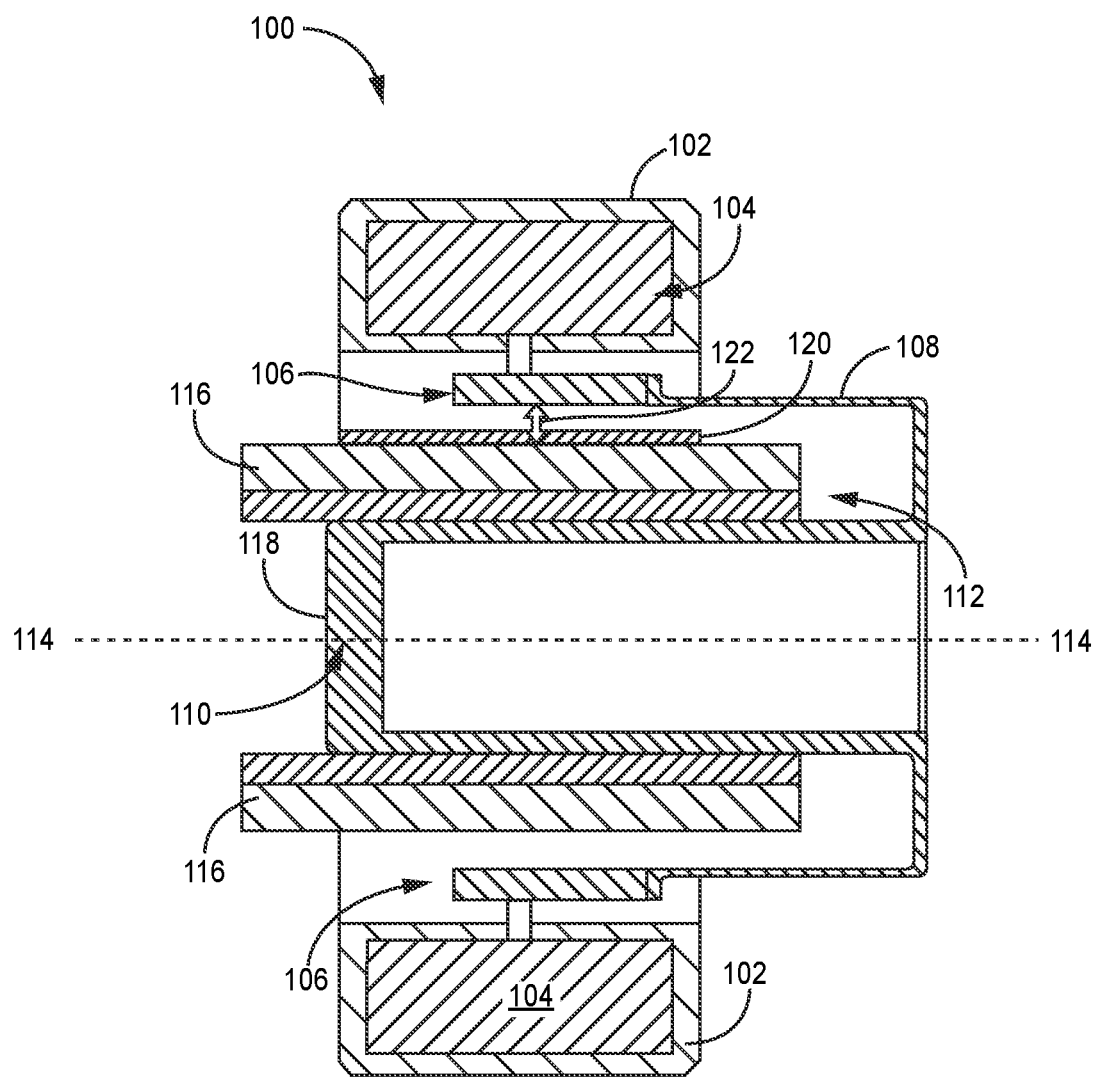
FIG. 1 illustrates a cross sectional side view of a moving magnet motor system having one or more ferromagnetic rods located on an inner yoke, according to some embodiments.

In some embodiments, the present disclosure is directed to a moving magnet motor having a magnetic ring coupled to a rider (i.e., a piston), the rider limited to linear movement upon a cylindrical axis wherein the longitudinal center of a cylinder defines the cylindrical axis. The moving magnet motor may be a linear motor having a moving magnet component affixed to a rider or piston. The moving magnet motor further comprising an outer yoke, an inner yoke, and a ferromagnetic rod running parallel to the cylindrical axis, the one or more ferromagnetic rods in magnetic communication with the magnetic ring. The ferromagnetic rod may be disposed on an outer surface of the inner yoke, on an inner surface of the outer yoke, or more generally, the ferromagnetic rod may be disposed anywhere between a coil located within the outer yoke and the rider. In some embodiments, the inner yoke further includes one or more rotatable rings, the rotatable rings disposed at a proximal end and distal end of each ferromagnetic rod. In some embodiments, the coil located in the outer yoke is driven with an AC signal to generate a magnetic field that interacts with the magnetic field of the magnetic ring to induce oscillation of the magnetic ring, and thus, oscillation of the rider in the cylinder. The one or more ferromagnetic rods located within the magnetic fields likewise generate an auxiliary force that is perpendicular to the longitudinal axis. Proper positioning of the one or more ferromagnetic rods causes the auxiliary force to cancel out or minimize the bearing side load forces caused by the motor magnet ring. As used hereinafter, the term "bearing side load" refers to side load forces between the rider and the bearing sleeve (i.e., a cylinder wall).

The linear magnetic motors described herein may be utilized in various applications, including but not limited to Stirling engines, Stirling coolers, integral Stirling coolers, split Stirling coolers, pumps, linear pumps, compressors, or other applications where linear motion or linear motors are utilized. The linear magnetic motors described herein may also be referred to as linear engines, linear transducers, linear actuators, or linear generators.

In some embodiments, the one or more ferromagnetic rods are adjustable around the circumference of the inner yoke, i.e., the ferromagnetic rods may be rotated around the circumference of the inner yoke and locked into place. The ferromagnetic rods may be positioned to offset or counteract side load forces. In some embodiments, a single ferromagnetic rod may be used to offset or counteract side load force. However, utilizing two or more ferromagnetic rods allows for simple tuning of the direction and magnitude of the auxiliary force to counteract the side load forces. For instance, if the moving magnetic motor is perfectly centered with no bearing side loads, the two ferromagnetic rods could be placed 180° apart to cancel each other out (assuming the two ferromagnetic rods had equivalent proportions and magnetic properties). Or in a more practical example, the two ferromagnetic rods could be selectively positioned to offset or minimize a bearing side load force in a y-direction while the two ferromagnetic rods offset each other's x-direction force components. In contrast, a moving magnet motor having a single ferromagnetic rod would have nothing (other than a motor side load force) to counteract any excess auxiliary force generated by the single ferromagnetic rod. Thus, the single ferromagnetic rod embodiment would require the single ferromagnetic rod generate the precise bearing side load force in precisely the opposite direction of the bearing side load.

In one embodiment, two ferromagnetic rods are disposed on the outer surface of the inner yoke. Each of the ferromagnetic rods are affixed to two rotatable rings. The rotatable rings are configured to secure to the outer surface of the inner yoke in a groove (or ring detent) and are slidable around the circumference of the inner yoke. Therefore, the two ferromagnetic rods can be selectively positioned to generate a magnetic auxiliary force upon the magnetic ring and improve linear motor alignment.

FIG. 1 illustrates a cross-sectional side view of a moving magnet motor system 100, including an outer yoke 102 housing a coil 104. The moving magnet motor system 100 includes a linear bearing system, the linear bearing system including a rider 110 (i.e., a piston) and a bearing liner 112 (i.e., a bearing sleeve). A magnetic ring 106 is disposed radially inward from the outer yoke 102 is supported on a proximal side by a magnet ring support structure 108. The magnetic ring 106 defines a magnetic ring central axis 114. The magnet ring support structure 108 is affixed to the rider 110 disposed within a cylinder 118. The cylinder 118 is disposed within an inner yoke 116 of the motor system 100. One or more ferromagnetic rods 120 (the ferromagnetic rod 120 may also be referred to as "magnetic rod") are disposed on the outer surface of the inner yoke 116 and are configured to provide a first magnetic interaction 122 between the magnetic ring 106 and the one or more ferromagnetic rods.

The rider 110 of the linear bearing system is configured to oscillate longitudinally along the magnetic ring central axis 114. The oscillation of the rider 110 is driven by electromagnetic interaction between the coil 104 and the magnetic ring 106. More specifically, an electrical (AC) current may be provided to the coil 104 which thereby generates a magnetic field that interacts with (i.e., supplies a magnetic force to) the magnetic ring 106 attached to the rider 110, causing the bearing to oscillate. In some embodiments, the oscillation frequency of the rider 110 may be between 1 Hz and 140 Hz, and in some embodiments, the oscillation frequency of the rider 110 may be between 30 Hz and 60 Hz.

The moving magnet motor system 100 includes the ferromagnetic rod 120 disposed on an outer surface of the inner yoke 116. The ferromagnetic rod 120 may be formed of iron, iron alloys or compounds, cobalt, nickel, and/or other rare-earth metals with ferromagnetic properties. In some embodiments, the ferromagnetic rod 120 may be fully or partially magnetized. The ferromagnetic rod 120 is configured to have a first magnetic communication 122 with the magnetic ring 106. The term "magnetic communication" refers to the interaction of magnetic fields which may result in a magnetic force acting on the respective components. The first magnetic communication 122 may be configured to magnetically center the inner yoke 116, the outer yoke 102, and the magnetic ring 106 on the magnetic ring central axis 114, or to otherwise reduce a motor side load.

In some embodiments, the magnetic ring 106 need not include a circular outer perimeter, but rather, may include a polygon shape and/or be comprised of a plurality of segments. As used hereinafter, the term "rider" (i.e., rider 110) may include a shaft, a bearing, a piston, and/or a sleeve, or any other linear bearing components known in the art. In some embodiments, the liner 112 is not required.

In some embodiments, the ferromagnetic rod 120 includes a rectangular cross-sectional profile. The length of the ferromagnetic rod 120 may extend continuously past the coil on one or more sides. In some embodiments, the ferromagnetic rod 120 may have a length extending farther than, or equal to, the travel of the magnetic ring 106. In other words, the magnetic ring 106 will be adjacent the ferromagnetic rod 120 as the magnetic ring 106 oscillates, and no part of the magnetic ring 106 will extend past the ferromagnetic rod 120 in either direction. The ferromagnetic rod 120 may have uniform ferromagnetic properties throughout. In other embodiments, the ferromagnetic rod 120 may include a circular, triangular, or other geometric cross-sectional profile. The ferromagnetic rod 120 may have non-uniform ferromagnetic properties.

Figure 2:
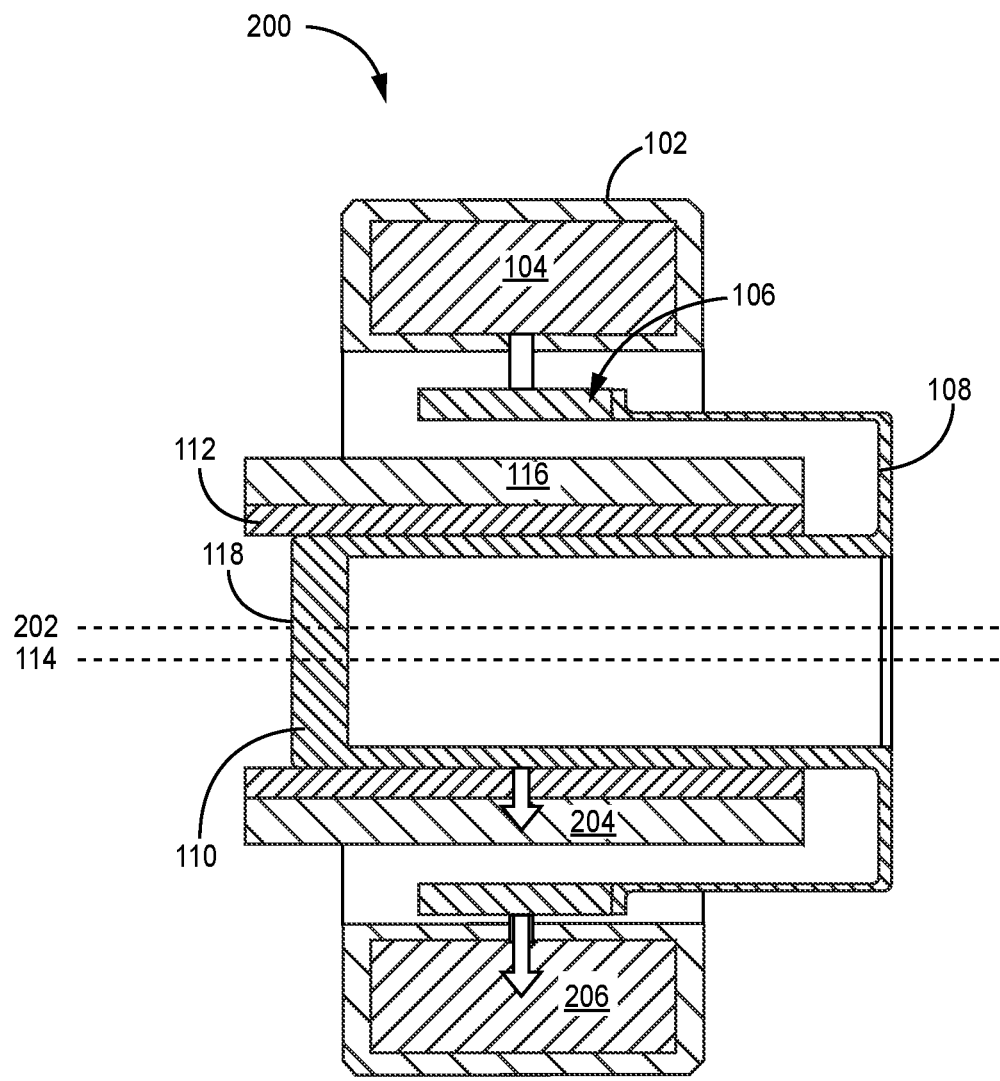
FIG. 2 illustrates a cross sectional side view of a moving magnet motor system having an outer yoke, an inner yoke, a magnetic ring, a rider, and a cylinder, the magnetic ring axis is offset from the motor axis, according to some embodiments.

For instance, FIG. 2 illustrates a moving magnet motor system 200 without a ferromagnetic rod. The magnetic ring central axis 114 is offset from an outer yoke central axis 202, or in other words, the components of the moving magnet motor system 200 are misaligned. Arrow 204 indicates a bearing side load 204 (also referred to as "a motor side load") between the rider 110 and the cylinder liner 112 which results from misalignment of one or more motor components. In some cases, the misalignment can be caused by a nonuniform magnetic (or auxiliary) force, represented by arrow 206, between the magnetic ring 106 and the outer yoke 202. Therefore, one or more ferromagnetic rods may be inserted and positioned within the moving magnet motor system 200, wherein the ferromagnetic rod interacts with the magnetic ring 106 to oppose the nonuniform auxiliary force 206, and thus, minimize or counteract the bearing side load 204.

Figure 3A:
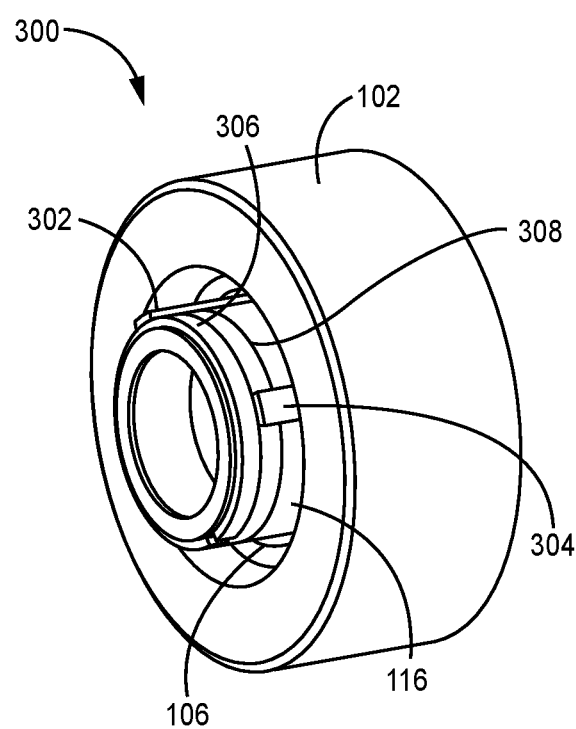
FIG. 3A illustrates an isometric view of a moving magnet motor including two ferromagnetic rods disposed on the outer surface of the inner yoke, according to some embodiments.

FIG. 3A illustrates an isometric view of a moving magnet motor 300 including a first ferromagnetic rod 302 and a second ferromagnetic rod 304 positioned radially inward of the outer yoke 102 and the magnetic ring 106 (the rider and cylinder are removed for viewing purposes). The first ferromagnetic rod 302 and the second ferromagnetic rod 304 are secured to a first ring 306 and a second ring 308, respectively, and extend parallel to a longitudinal axis of the inner yoke 116. The first ring 306 and the second ring 308 are disposed on an outer surface of the inner yoke 116. In some embodiments, a single ring may be used to secure the one or more ferromagnetic rods to the moving magnet motor 300. In other embodiments, the moving magnet motor 300 may include two or more rings.

Figure 3B:
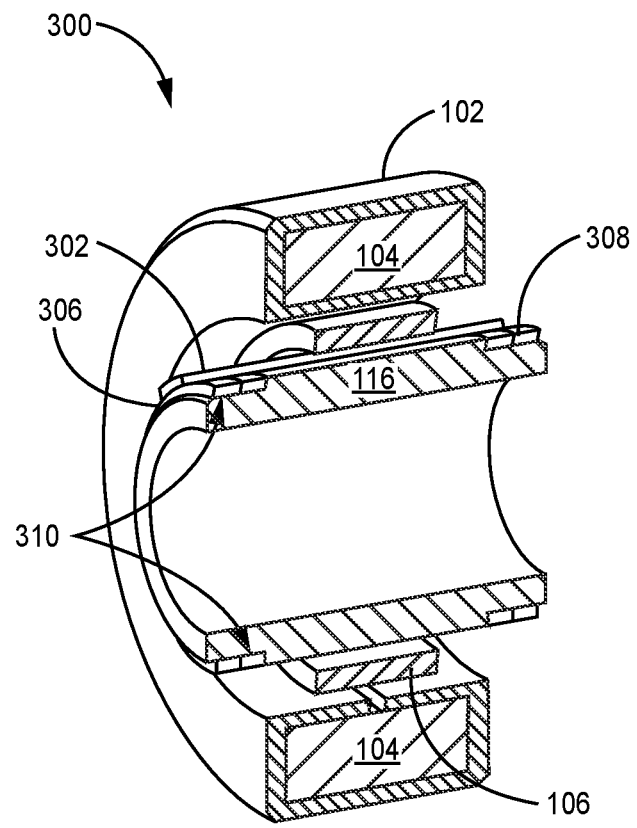
FIG. 3B illustrates a cross sectional isometric view of a moving magnet motor including two ferromagnetic rods disposed on the outer surface of the inner yoke, according to some embodiments.

FIG. 3B illustrates a cross-sectional isometric view of the moving magnet motor 300. In some embodiments, the inner yoke 116 includes a ring detent 310 such that the first ring 306 and the second ring 308 may be flush with the outer surface of the inner yoke. The ring detent 310 may be configured to partially house and/or support one or more rings and may be positioned at any location on the outer surface of the inner yoke 116. In the embodiment illustrated in FIGS. 3A-3B, the ring detent 310 is positioned at the ends of the inner yoke 116 to facilitate assembly and/or removal of the first ring 306 and the second ring 308 from the moving magnet motor 300.

The first ring 306, the second ring 308, and/or the ring detent 310 may be configured to allow slidable adjustment of the locations of the first ferromagnetic rod 302 and the second ferromagnetic rod 304 along the circumference of the inner yoke 116. For instance, the first ring 306 secured to the first ferromagnetic rod 302 may be rotated clockwise or counterclockwise around the circumference of the inner yoke 116. Likewise, the second ring 308 secured to the second ferromagnetic rod 304 may be rotated clockwise or counterclockwise around the circumference of the inner yoke 116. The first ferromagnetic rod 302 and the second ferromagnetic rod 304 may be selectively locked into a desired position. Thus, the position of each of the ferromagnetic rods 302, 304 are selectively adjustable.

Figure 3C:
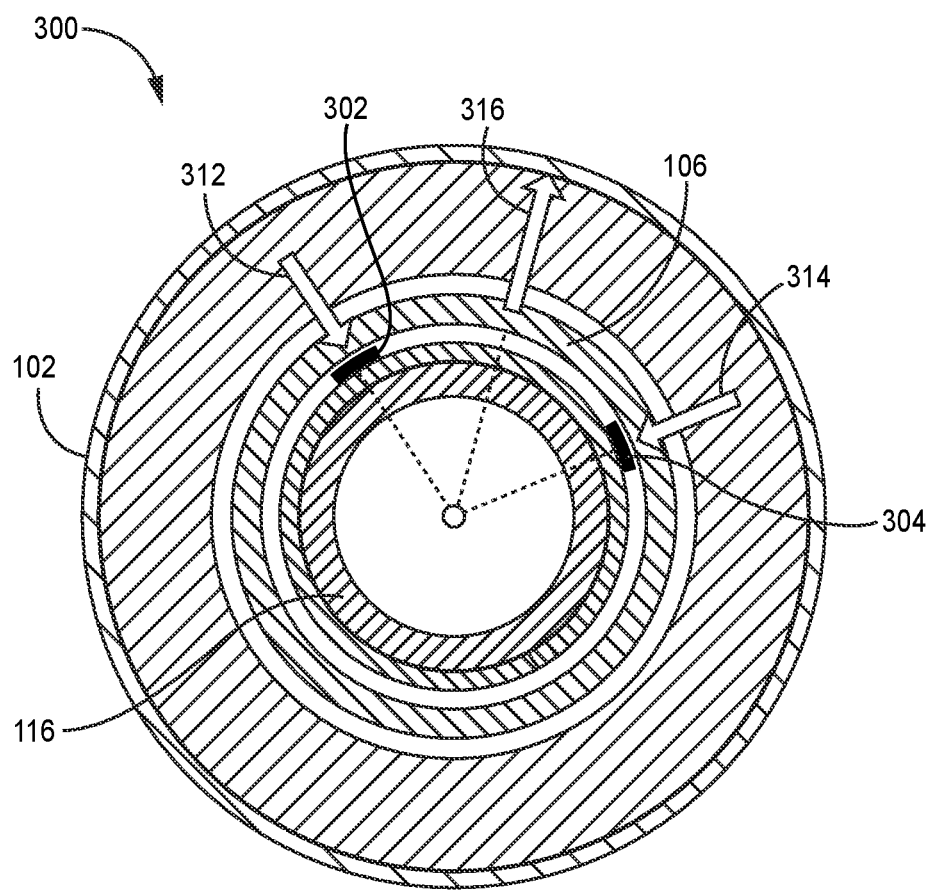
FIG. 3C illustrates a front view of a moving magnet motor including two ferromagnetic rods disposed on the outer surface of the inner yoke, according to some embodiments.

FIG. 3C illustrates a front view of the moving magnet motor 300 (with the rider and cylinder removed for viewing purposes). The first ferromagnetic rod 302 is selectively positioned to provide a first auxiliary force 312 upon the magnet ring 106. The first auxiliary force 312 may be generated via electromagnetic interaction of two or more of the coil 104, the magnetic ring 106, and/or the first ferromagnetic rod 302. The second magnetic rod 304 is selectively positioned to provide a second auxiliary force 314. The second auxiliary force 314 may be generated via electromagnetic interaction the magnetic ring 106 and the second ferromagnetic rod 304. The first auxiliary force 312 and the second auxiliary force 314 may offset or counteract a side load force 316, or in other words, the sum of the first auxiliary force 312, the auxiliary force 314, and the side load force 316 is approximately zero. Thus, the total side load force is substantially reduced.

In some embodiments, the first ferromagnetic rod 302 and the second ferromagnetic rod 304 may be selectively positioned to generate combined auxiliary force to offset a side load force. For instance, positioning one or more of the first ferromagnetic rod 302 and the second ferromagnetic rod 304 may generate a combined auxiliary force having an equal magnitude to the side load force oriented in an opposite direction (180°) from the side load force. Thus, the selective positioning of the first ferromagnetic rod 302 and/or the second ferromagnetic rod 304 may allow a user to control a magnitude and a direction of a combined auxiliary force to offset a side load force.

In some embodiments, one or more properties of the ferromagnetic rod may be selected to control a magnitude of an auxiliary force. For instance, the shape of the rod, the uniform/non-uniform ferromagnetic properties along the length of the rod, the distance between the rod and the coil, the number of rods used, etc., may impact a magnitude of an auxiliary force.

Figure 4A:
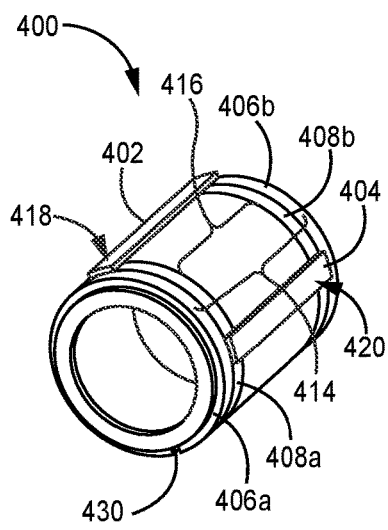
FIG. 4A illustrates an isometric view of an inner yoke of a moving magnet motor including two ferromagnetic rods disposed on the outer surface of the inner yoke, according to some embodiments.
Figure 4B:
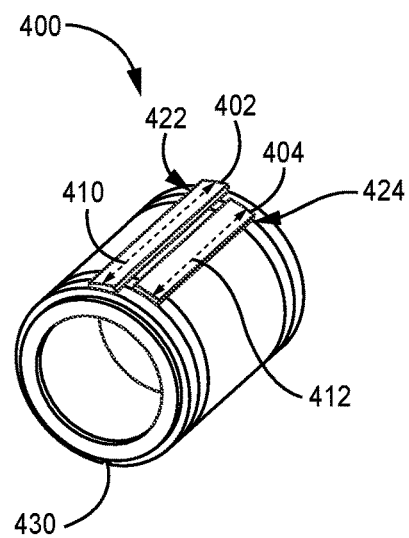
FIG. 4B illustrates an isometric view of an inner yoke of a moving magnet motor including two ferromagnetic rods disposed on the outer surface of the inner yoke, according to some embodiments.
Figure 4C:
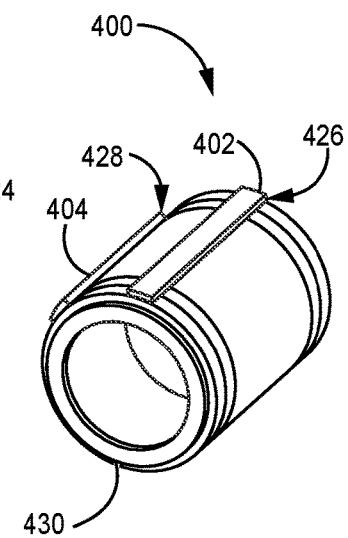
FIG. 4C illustrates an isometric view of an inner yoke of a moving magnet motor including two ferromagnetic rods at different locations disposed on the outer surface of the inner yoke, according to some embodiments.

FIGS. 4A-4C illustrate isometric views of an inner yoke 400 having a first ferromagnetic rod 402 and a second ferromagnetic rod 404 disposed on the outer surface of the inner yoke 400. The first ferromagnetic rod 402 is secured to a first pair of rings 406a, 406b. In some embodiments, the ring 406a may be secured on an end of the first ferromagnetic rod 402 and the ring 406b may be secured on an opposing end of the first ferromagnetic rod 402. The distance between the ends of the first ferromagnetic rod 402 defines a first rod length 410 and the distance between the first pair of rings 406a, 406b defines a first ring distance 414. In some embodiments, the ring 408a may be secured on an end of the second ferromagnetic rod 404 and the ring 408b may be secured on an opposing end of the second ferromagnetic rod 404. The distance between the ends of the second ferromagnetic rod 404 defines a second rod length 412 and the distance between the second pair of rings 408a, 408b defines a second ring distance 416. In the embodiment shown in FIGS. 4A-4C, the first rod length 410 is greater than the second rod length 412, and the first ring distance 414 is greater than the second ring distance 416. In other embodiments, the rod lengths 410, 412 may be equal and the ring distances 414, 416 may be equal. The rings 406, 408 include a ring notch 430 which may be configured to aid in the assembly and/or removal of the rings 406, 408 from the inner yoke 400, aid in the selective rotation of the rings 406a, 406b, 408a, 408b around the circumference of the inner yoke, and/or aid in selectively locking the rings 406a, 406b, 408a, 408b into a location. In some embodiments, a single ring may be used to secure a ferromagnetic rod to the inner yoke. In other embodiments, three or more rings may be used to secure a ferromagnetic rod to the inner yoke.

FIGS. 4A-4C illustrate the selective adjustment of the locations of the first ferromagnetic rod 402 and the second ferromagnetic rod 404. The inner yoke 400, the first pair of rings 406a, 406b, and the second pair of rings 408a, 408b may be configured to allow slidable adjustment of the locations of the first ferromagnetic rod 402 and the second ferromagnetic rod 404 along the circumference of the inner yoke 400. The first pair of rings 406a, 406b secured to the first ferromagnetic rod 402 may be rotated clockwise or counterclockwise around the circumference of the inner yoke 400. Likewise, the second pair of rings 408a, 408b secured to the second ferromagnetic rod 404 may be rotated clockwise or counterclockwise around the circumference of the inner yoke 400. The first ferromagnetic rod 402 and the second ferromagnetic rod 404 may be selectively locked into a desired position. Thus, the position of each of the ferromagnetic rods 302, 304 are selectively adjustable. For instance, FIG. 4A illustrates the first ferromagnetic rod 402 located at a first position 418 and the second ferromagnetic rod 404 located at a second position 420. FIG. 4B illustrates the first ferromagnetic rod 402 located at a third position 422 and the second ferromagnetic rod 404 located at a fourth position 424. FIG. 4C illustrates the first ferromagnetic rod 402 located at a fifth position 426 and the second ferromagnetic rod 404 located at a sixth position 428. The first ferromagnetic rod 402 and the second ferromagnetic rod 404 may be positioned at any location around the circumference of the inner yoke 400, or in other words, the ferromagnetic rods 402, 404 are capable of infinite/continuous locations around the circumference of the inner yoke 400. In some embodiments, the first ferromagnetic rod 402 and the second ferromagnetic rod 404 may be disposed on the same circumferential plane, and thus, may not be capable of overlapping. In other embodiments, the first ferromagnetic rod 402 and the second ferromagnetic rod 404 may be disposed at different circumferential planes and/or be shaped to allow for complete or partial overlapping.

Figure 5:
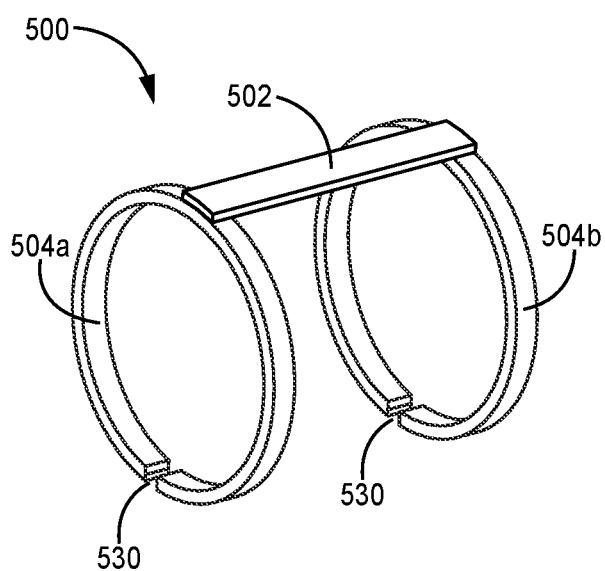
FIG. 5 illustrates an isometric view of an alignment assembly including a ferromagnetic rod and two rotatable rings, according to some embodiments.

FIG. 5 illustrates an isometric view of an alignment assembly 500. The alignment assembly 500 includes a ferromagnetic rod 502 secured to a pair of rings 504a, 504b. The ferromagnetic rod 502 is secured to the ring 504a at an end and secured to the ring 504b at the opposite end of the ferromagnetic rod 503. The pair of rings 504a, 504b each include a ring notch 530. The alignment assembly 500 may be used to align one or more moving magnet motor components (not shown in FIG. 5) and/or to offset or counteract a bearing side load on a moving magnet motor (not shown in FIG. 5). In some embodiments, the ring notch 530 may be configured to enhance the selective positioning of the ring 504a, 504b, and therefore the positioning of the ferromagnetic rod 502, by providing an engagement surface to rotate the rings 504a, 504b. In some embodiments, the ring notch 530 may provide the ring 504a, 504b additional flexibility, spring force, and/or a snap-on/snap-off capability.

The above FIGS. 1-5 describe embodiments/components of a moving magnet motor system wherein the one or more ferromagnetic rods are located on the outer surface of the inner yoke. However, as described below, the one or more ferromagnetic rods may be positioned on other components of the moving magnet motor, e.g., the outer yoke, the magnetic ring, or a combination of two or more of the inner yoke, the outer yoke, and the magnetic ring. Furthermore, the length and cross-sectional shape of each of the ferromagnetic rods may vary.

Figure 6:
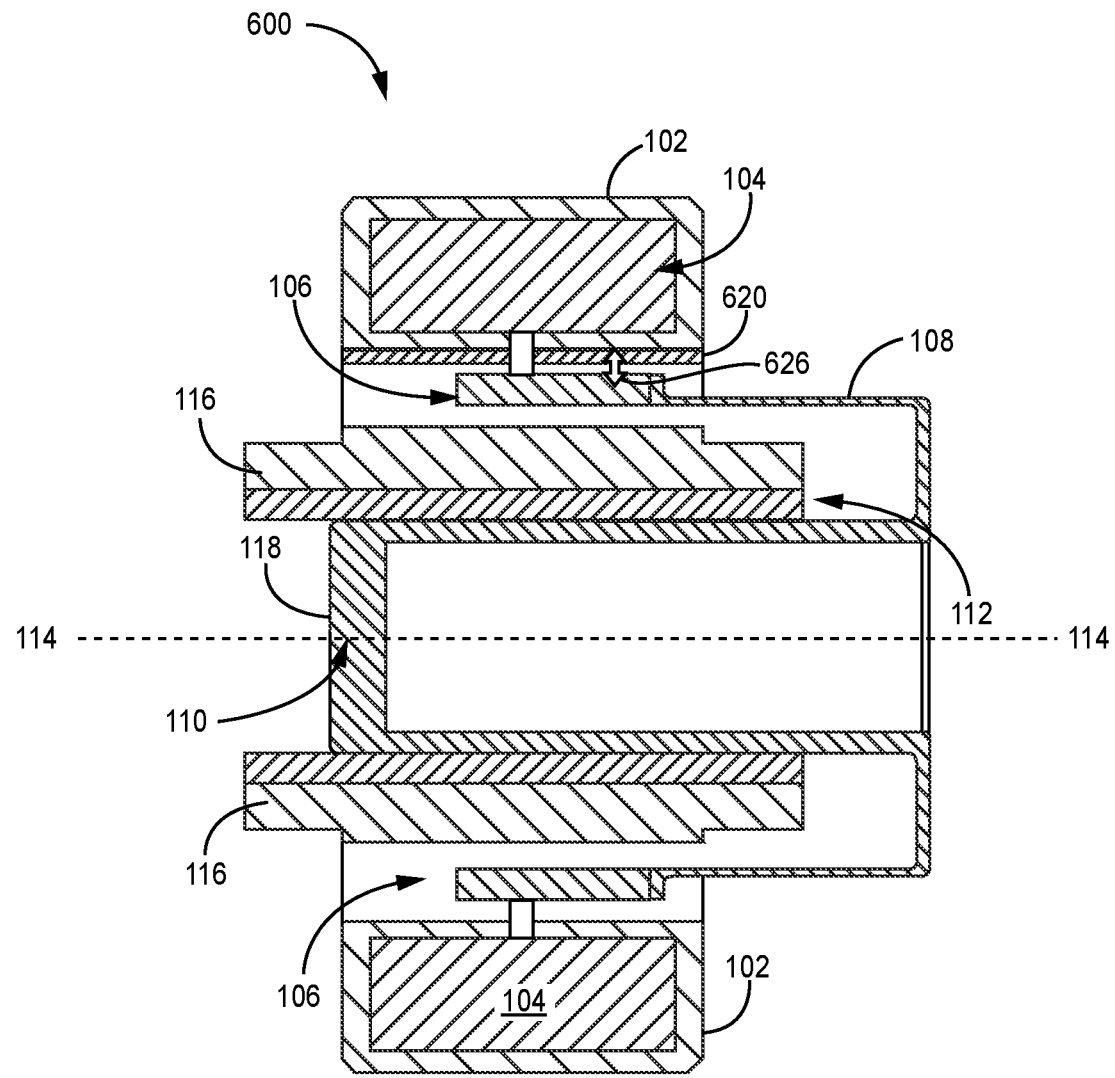
FIG. 6 illustrates a cross sectional side view of a moving magnet motor system having one or more ferromagnetic rods disposed on an outer yoke, according to some embodiments.

FIG. 6 illustrates a cross-sectional side view of a moving magnet motor system 600 including a ferromagnetic rod 620 disposed on the inner surface of the outer yoke 102. Aside from the location of the ferromagnetic rod 620 on the outer yoke 102, FIG. 6 is otherwise identical to FIG. 1 (illustrating the ferromagnetic rod 120 located on the inner yoke 116). The ferromagnetic rod 620 may provide an auxiliary force 626 upon the magnetic ring 106, thereby minimizing a side load force or aligning one or more moving magnet engine components. In some embodiments, the one or more ferromagnetic rods 620 disposed on the inner surface of the outer yoke 102 may be positionally adjustable via one or more rings (not shown) disposed on the inner surface of the outer yoke 102.

Figure 7:
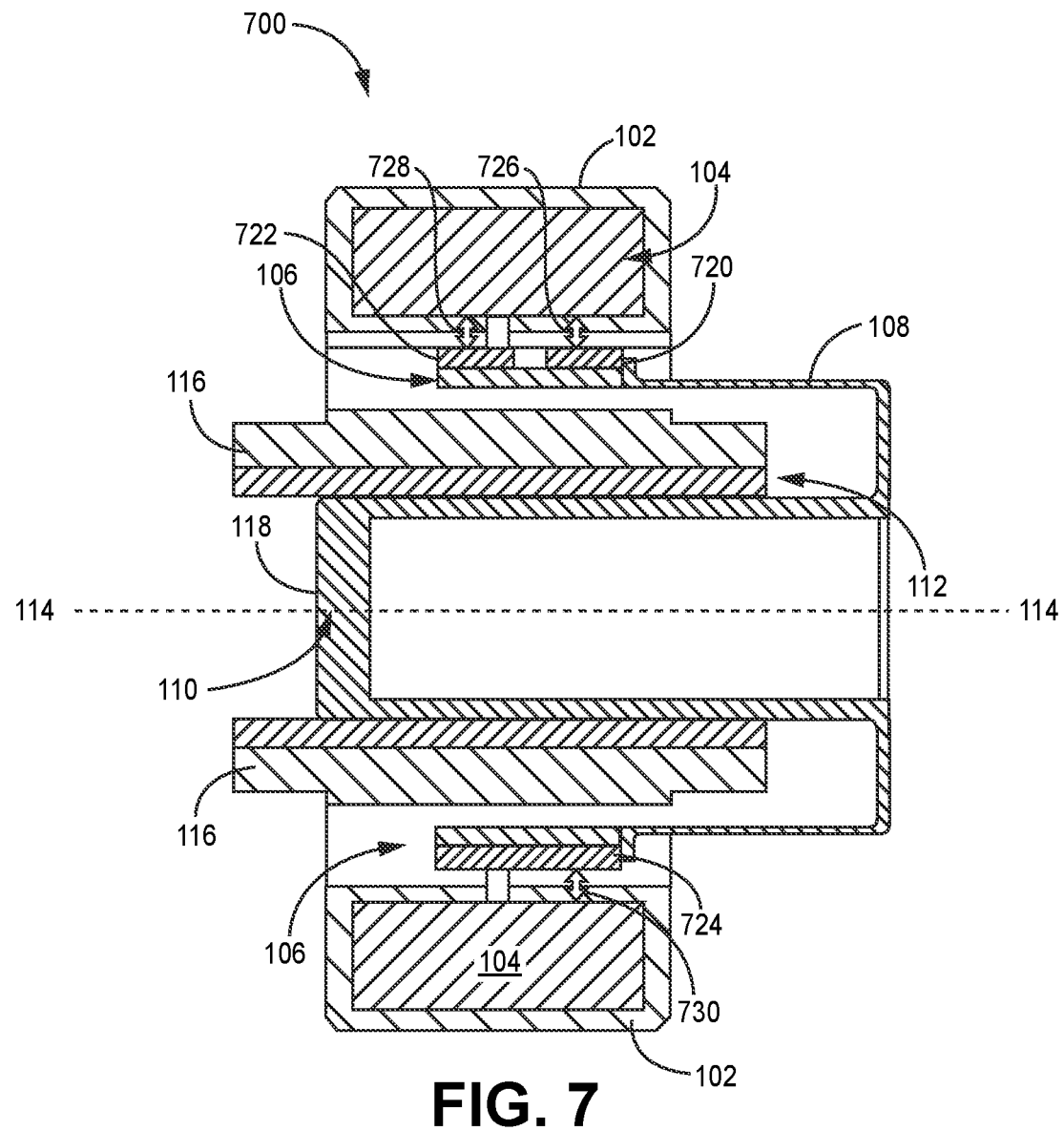
FIG. 7 illustrates a cross sectional side view of a moving magnet motor system having one or more ferromagnetic rods disposed on a magnetic ring, according to some embodiments.

FIG. 7 illustrates a cross-sectional side view of a moving magnet motor system 700 including a first ferromagnetic rod 720, a second ferromagnetic rod 722, and a third ferromagnetic rod 724 disposed on an outer surface of the magnetic ring 106. Other than the location of the ferromagnetic rods 720, 722, 724 on the magnetic ring 106, FIG. 7 is otherwise identical to FIG. 1 (illustrating the ferromagnetic rod 120 located on the inner yoke 116). The outer yoke 102 may provide a first auxiliary force 726, a second auxiliary force 728, and a third auxiliary force 730 upon the first ferromagnetic rod 720, the second ferromagnetic rod 722, and the third ferromagnetic rod 724, respectively, disposed on an outer surface of the magnetic ring 106. Thus, the auxiliary forces 726, 728, 730 provided on the magnetic ring 106 may minimize a side load force or magnetically align one or more moving magnet engine components.

In some embodiments, one or more of the ferromagnetic rods 720, 722, 724 may include two distinct sections along an axis. For instance, the ferromagnetic rod 720 defines a first section along an axis and the ferromagnetic rod 722 defines a second section along the axis.

Figure 8:
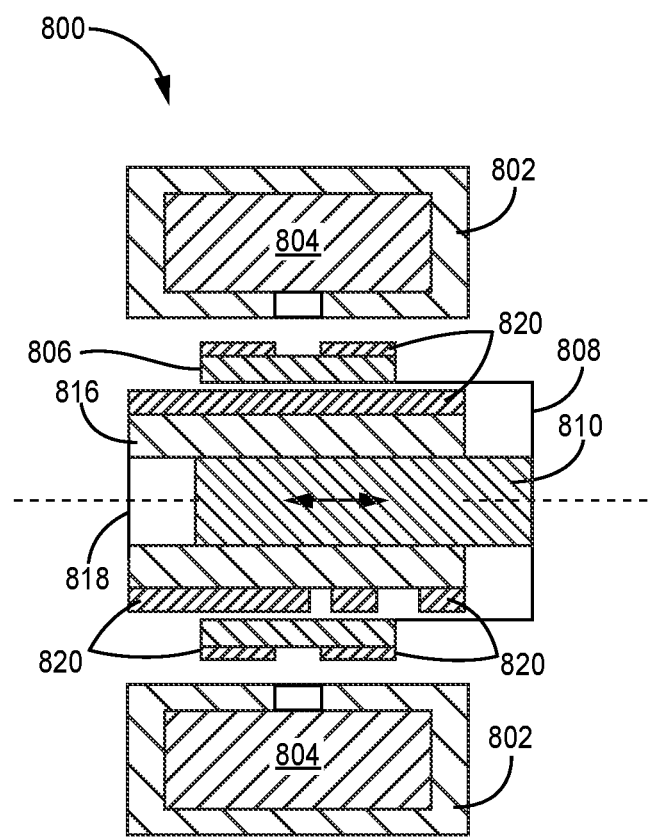
FIG. 8 illustrates a diagrammatic side view of a moving magnet motor system having one or more ferromagnetic rods disposed on a magnetic ring and disposed on an inner yoke, according to some embodiments.

FIG. 8 illustrates a diagrammatic side view of a moving magnet motor system 800 having a plurality of ferromagnetic rods 820 disposed on a magnetic ring 806 and disposed on an inner yoke 816. The moving magnet motor system 800 includes an outer yoke 802 housing a coil 804, the magnetic ring 806 secured to a magnet ring support structure 808 coupled to a rider 810 disposed within a cylinder 818. In some embodiments, the cylinder 818 may include a bearing sleeve (not shown) disposed on the inner surface of the cylinder 818. FIG. 8 illustrates the plurality of ferromagnetic rods 820 having various lengths ranging from the length of the inner yoke 816 to less than half the length of the magnetic ring 806. The plurality of ferromagnetic rods 820 are disposed on the outer surface of the magnetic ring 806 and the outer surface of the inner yoke 816.

In some embodiments, the various lengths and locations of the ferromagnetic rods 820 may be configured for simple calibration of the moving magnet motor system 800. For instance, the larger ferromagnetic rods may generate a larger auxiliary force, and thus, selective rotation of the larger ferromagnetic rods allows for coarse adjustment of the combined auxiliary force. The smaller ferromagnetic rods may generate a smaller auxiliary force, and thus, selective rotation of the smaller ferromagnetic rods allows for fine adjustment of the combined auxiliary force.

Figure 9:
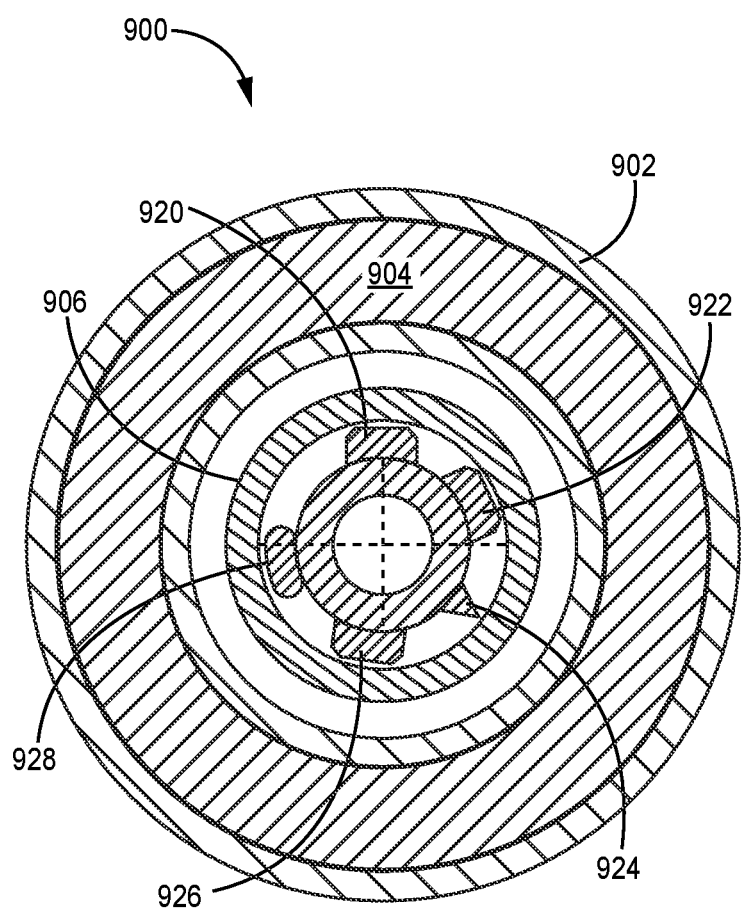
FIG. 9 illustrates a diagrammatic front view of a moving magnet motor system having one or more ferromagnetic rods having a different cross-sectional shape, according to some embodiments.

FIG. 9 illustrates a diagrammatic front view of a moving magnet motor 900 including a plurality of ferromagnetic rods disposed within a magnetic ring 906. The moving magnet motor 900 further includes an outer yoke 902 and a coil 904 surrounding the magnetic ring 906. A first ferromagnetic rod 920, a second ferromagnetic rod 922, and a fourth ferromagnetic rod 926 have a substantially rectangular cross-sectional profile. A third ferromagnetic rod 924 has a substantially triangular cross-sectional profile and a fifth ferromagnetic rod 928 has a substantially rounded cross-sectional profile. The ferromagnetic rods 920, 922, 924, 926, 928 are spaced at various angular distances from each other.

Figure 10B:
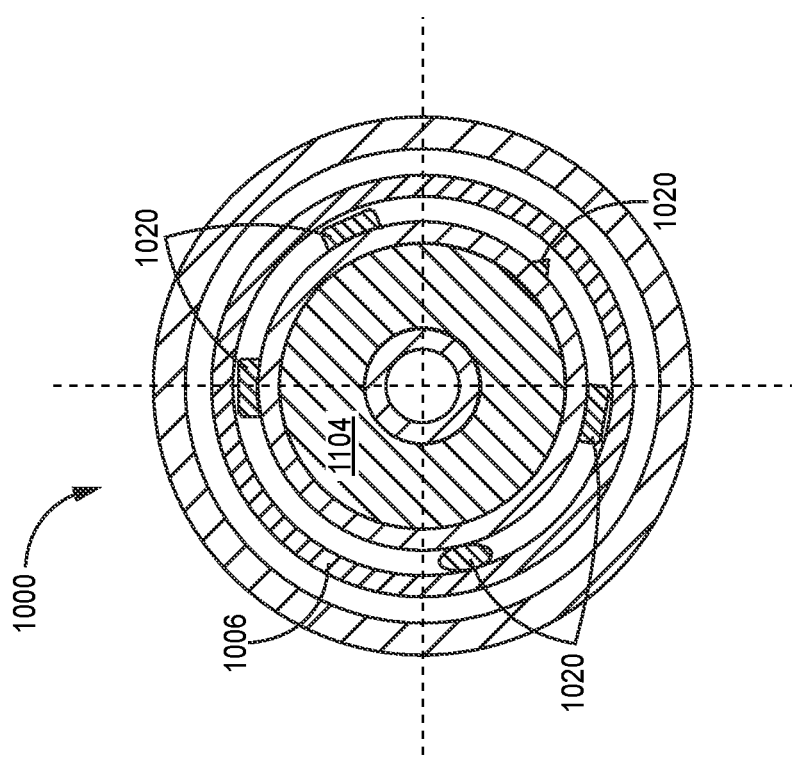
FIG. 10B illustrates a diagrammatic front view of a moving magnet motor system having one or more ferromagnetic rods disposed on an inner yoke wherein a motor coil is disposed radially inward of a magnetic ring, according to some embodiments.
Figure 10A:
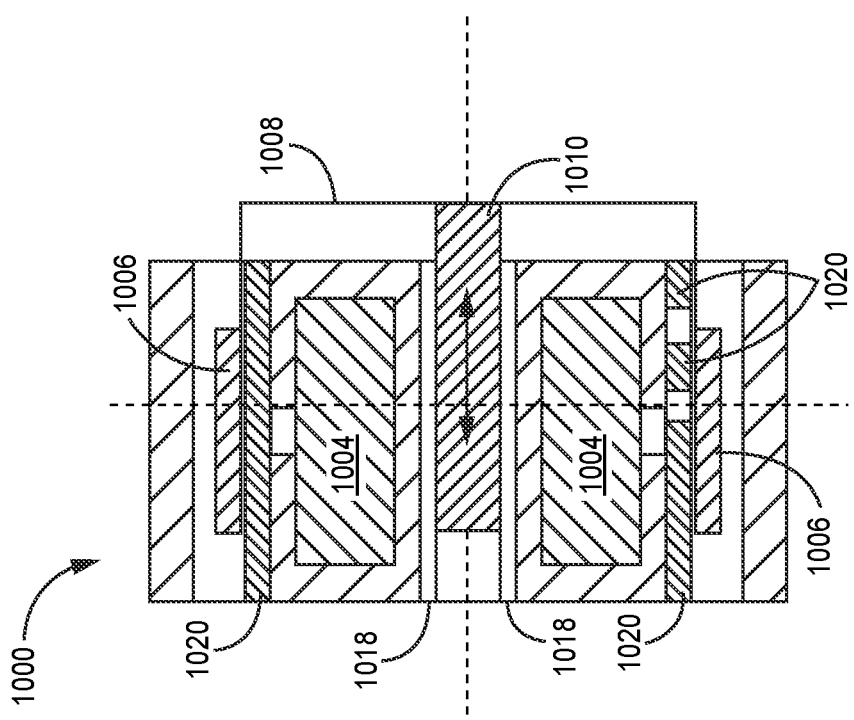
FIG. 10A illustrates a diagrammatic side view of a moving magnet motor system having one or more ferromagnetic rods disposed on an inner yoke wherein a motor coil is disposed radially inward of a magnetic ring, according to some embodiments.

FIGS. 10A-10B illustrate a moving magnet motor 1000 including a coil 1004 disposed inside of a magnetic ring 1006. The coil 1004 may be configured to receive an AC current to generate a magnetic field. The magnetic field may interact with the magnetic ring 1006 disposed radially outward from the coil. A plurality of ferromagnetic rods 1020 are positioned radially outward from the coil 1004 and radially inward from the magnetic ring 1006. The magnetic ring 1006 is connected to a magnet ring support structure 1008 secured to a rider 1010, such that the oscillation of the magnetic ring 1006 drives the rider 1010. The rider 1010 may be configured to oscillated within the cylinder 1018. In some embodiments, the cylinder 1018 may include a bearing sleeve on the inner surface of the cylinder 1018. The plurality of ferromagnetic rods 1020 may vary in length and cross-sectional profile.

FIGS. 11A-11B illustrate a moving magnet motor 1100 including a coil 1104 disposed inside of a magnetic ring 1106. The coil 1104 may be configured to receive an AC current to generate a magnetic field. The magnetic field may interact with the magnetic ring 1106 disposed radially outward from the coil 1104 to oscillate a rider 1110. A plurality of ferromagnetic rods 1120 are positioned radially outward from the coil 1104 and radially outward from the magnetic ring 1106. The rider 1110 may oscillate within a cylinder 1118, the cylinder including a bearing sleeve (not shown) disposed on the inner surface of the cylinder 1118. The plurality of ferromagnetic rods may be configured to offset or counteract a bearing side load. The magnetic ring 1106 is connected to a magnet ring support structure 1108 secured to the rider 1110. The plurality of ferromagnetic rods 1120 may vary in length and cross-sectional profile.

Figure 12A:
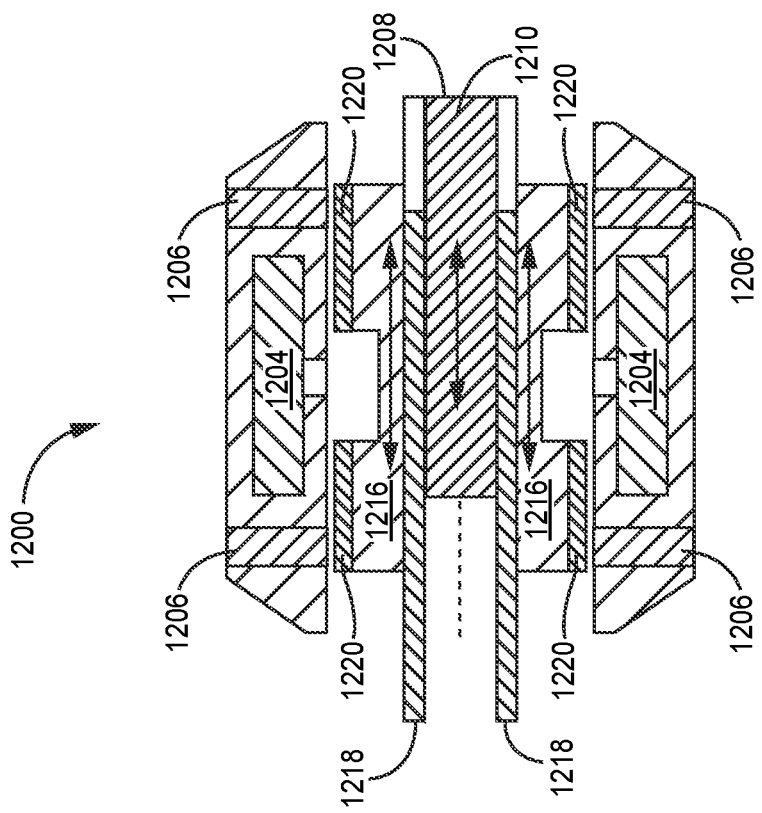
FIG. 12A illustrates a diagrammatic side view of a linear reluctance motor system having one or more ferromagnetic rods, according to some embodiments.
Figure 12B:
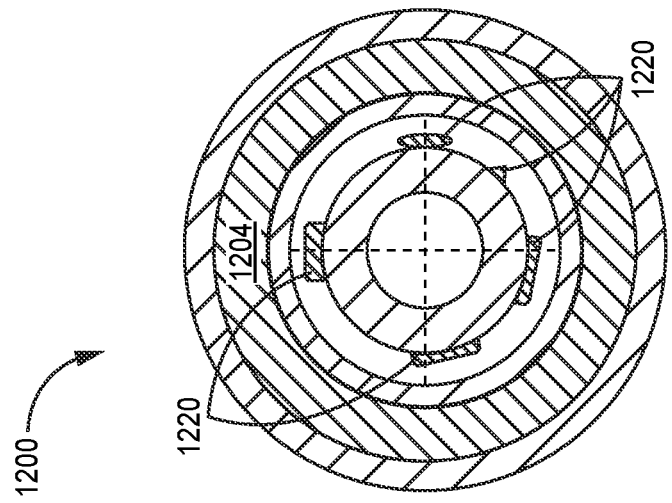
FIG. 12B illustrates a diagrammatic front view of a linear reluctance motor system having one or more ferromagnetic rods, according to some embodiments.

FIGS. 12A-12B illustrate a linear motor 1200 including a coil 1204 configured to generate a magnetic field, a plurality of magnetic features 1206, and an inner yoke support 1208 secured to an inner yoke 1216. The linear motor 1200 may be configured to use magnetic reluctance to enhance performance of the linear motor 1200. For instance, an electrical AC current may be provided to the coil 1204, and the coil 1204 may generate an electromagnetic field. The plurality of magnetic features 1206 may interact with the electromagnetic field and produce a magnetic reluctance. The magnetic reluctance may impart a linear force upon the inner yoke 1216 affixed to the rider 1210, causing the rider 1210 to oscillate. A plurality of ferromagnetic rods 1220 of various lengths and cross-sectional profiles are disposed on the inner yoke 1216. The plurality of ferromagnetic rods 1220 may be configured to offset of counteract a bearing side load. In some embodiments, the plurality of ferromagnetic rods 1220 may be selectively positioned on an outer surface of the inner yoke 1216 to offset a bearing side load. In some embodiments, the inner yoke 1216 may ride on an outer bearing sleeve (not shown) of the cylinder 1218 and oscillate with the rider 1210. In some embodiments, the cylinder 1218 may include an inner bearing sleeve (not shown) on the inner surface of the cylinder 1218.

While the disclosure has been described with reference to an exemplary embodiment(s), it will be understood by those skilled in the art that various changes may be made, and equivalents may be substituted for elements thereof without departing from the scope of the embodiment(s). In addition, many modifications may be made to adapt a particular situation or material to the teachings of the embodiment(s) without departing from the essential scope thereof. Therefore, it is intended that the disclosure is not limited to the disclosed embodiment(s), but that the disclosure will include all embodiments falling within the scope of the appended claims. Various examples have been described. These and other examples are within the scope of the following claims.

What is claimed is:

1. A moving magnet motor system, comprising:
   a cylinder having a cylindrical axis;
   a rider disposed within the cylinder, wherein the rider moves longitudinally along the cylindrical axis within the cylinder;
   a coil configured to generate an electromagnetic field;
   a magnet ring support structure affixed to the rider;
   a magnetic ring affixed to the magnet ring support structure and comprising a plurality of magnets configured to interact with the electromagnetic field generated by the coil to impart linear force to the rider; and
   one or more ferromagnetic rods extending parallel to the cylindrical axis and positionally adjustable along a circumference centered on the cylindrical axis.

2. The moving magnet motor system of claim 1, further comprising:
   an inner yoke located radially inward of the magnetic ring, wherein the one or more ferromagnetic rods are located adjacent to an external surface of the inner yoke.

3. The moving magnet motor system of claim 1, further including:
   an outer yoke located radially outward of the magnetic ring, wherein the one or more ferromagnetic rods are located adjacent to an internal surface of the outer yoke.

4. The moving magnet motor system of claim 1, wherein the one or more ferromagnetic rods are disposed on the magnetic ring and/or the magnet ring support structure.

5. The moving magnet motor system of claim 1, wherein the coil is disposed radially inward of the magnetic ring, the coil including a coil yoke outer surface, wherein the one or more ferromagnetic rods are located adjacent to the coil yoke outer surface.

6. The moving magnet motor system of claim 1, wherein one or more rings coupled to each of the one or more ferromagnetic rods.

7. The moving magnet motor system of claim 6, wherein the one or more rings are rotatable relative to the cylindrical axis to adjustably position the one or more ferromagnetic rods along a circumferential direction.

8. The moving magnet motor system of claim 7, wherein the one or more ferromagnetic rods are configured to be selectively secured at a plurality of locations.

9. The moving magnet motor system of claim 1, further including a displacer in communication with the rider, a compression space located between the displacer and the rider, and an expansion space distal to an end of the displacer, wherein the rider and the displacer are configured to cool the expansion space.

10. A moving magnet motor, comprising:
a cylinder having a cylindrical axis;
a rider disposed within the cylinder, wherein the rider is configured to move longitudinally along the cylindrical axis;
a coil configured to generate a magnetic field;
a magnet ring support structure affixed to the rider;
a magnetic ring affixed to the magnet ring support structure; and
an alignment assembly including:
one or more ferromagnetic rods in magnetic communication with the magnetic ring and/or the magnetic field of the coil,
one or more rings coupled to each of the one or more ferromagnetic rods,
wherein each of the one or more ferromagnetic rods are positionally adjustable.

11. The moving magnet motor of claim 10, further including:
an inner yoke located radially inward of the magnetic ring, wherein the one or more ferromagnetic rods are located adjacent to an external surface of the inner yoke.

12. The moving magnet motor of claim 11, wherein the inner yoke includes one or more detents, the one or more detents configured to slidably secure the one or more rings coupled to each of the one or more ferromagnetic rods.

13. The moving magnet motor of claim 10, further including:
an outer yoke located radially outward of the magnetic ring, wherein the one or more ferromagnetic rods are located adjacent to an internal surface of the outer yoke.

14. The moving magnet motor of claim 10, wherein the one or more ferromagnetic rods are disposed on the magnetic ring and/or the magnet ring support structure.

15. The moving magnet motor of claim 10, wherein the coil is disposed radially inward of the magnetic ring, the coil including a coil yoke outer surface, wherein the one or more ferromagnetic rods are located adjacent to the coil yoke outer surface.

16. The moving magnet motor of claim 10, wherein the alignment assembly includes a plurality of ferromagnetic rods, wherein the plurality of ferromagnetic rods have different lengths.

17. The moving magnet motor of claim 10, wherein the one or more ferromagnetic rods provide an auxiliary force on the magnetic ring, the auxiliary force configured to reduce a cylinder side load and/or a bearing side load.

18. The moving magnet motor of claim 10, wherein the moving magnet motor is configured to be utilized in one or more of a Stirling engine, a Stirling cooler, a pump, a linear pump, and/or a compressor.

19. The moving magnet motor of claim 10, wherein each of the one or more ferromagnetic rods are positionally adjustable along a circumference centered on the cylindrical axis.

20. A magnetic reluctance motor, comprising:
a cylinder having a cylindrical axis;
a rider disposed within the cylinder, wherein the rider moves longitudinally along the cylindrical axis within the cylinder;
a coil configured to generate an electromagnetic field;
a magnetic feature, wherein the magnetic feature and the electromagnetic field are configured to generate a magnetic reluctance;
an inner yoke affixed to the rider, the inner yoke configured to interact with the magnetic reluctance to impart linear force to the rider; and
one or more ferromagnetic rods extending parallel to the cylindrical axis wherein the one or more ferromagnetic rods are configured to reduce a bearing side load via a magnetic force between the magnetic feature and the one or more ferromagnetic rods, wherein the one or more ferromagnetic rods are positionally adjustable on an outer surface of the inner yoke.

* * * * *